(No Model.)

W. G. MILLER.
TRUCK FOR RAILWAY CARS.

No. 467,293. Patented Jan. 19, 1892.

WITNESSES
E. H. Gilman
B. S. Woodill

INVENTOR
Wm. G. Miller
by Albert E. Leach
his Atty.

UNITED STATES PATENT OFFICE.

WILLIAM G. MILLER, OF CAMBRIDGE, MASSACHUSETTS.

TRUCK FOR RAILWAY-CARS.

SPECIFICATION forming part of Letters Patent No. 467,293, dated January 19, 1892.

Application filed September 19, 1891. Serial No. 406,199. (No model.)

*To all whom it may concern:*

Be it known that I, WILLIAM G. MILLER, a citizen of the United States, residing at Cambridge, in the county of Middlesex and Commonwealth of Massachusetts, have invented a certain new and Improved Connection Between Car Frame and Axle, of which the following is a full specification.

My invention consists of an improved device for connecting the axle to the frame of the car in such a manner as to allow a free pivotal or rocking motion of said axle in a plane through the same at right angles to the track, the pivotal points about which the axle turns in rocking being in a vertical plane through the center of the axle.

My improved device is to be used on one axle only of a two-axle or four-wheeled car, the other axle running in ordinary bearing-boxes secured in any desired manner to the frame of the car.

My invention, while adapted for various kinds of cars and locomotives, is especially useful in gravel and platform cars, my object being to produce a simple and cheap construction which may be employed with advantage on cars to be used on roughly-laid tracks, especially those tracks carelessly laid for temporary purposes, whereon, by reason of their unevenness, cars are frequently leaving the rails, thereby causing great annoyance.

The springs ordinarily used on gravel-cars, to make them keep the track, fail to accomplish on such rough tracks the object for which they are intended, for the reason that the springs do not yield or compress enough to allow all four wheels to at all times keep in contact with the rails, especially when there are abrupt depressions in one rail or the other, or when on a curve the outer rail does not happen to be the highest.

With my improved device no springs whatever need be employed, and the danger of the car leaving the rails is reduced to a minimum by reason of the peculiar pivoting of the axle to the car, in the manner hereinafter described in detail.

Figure 1:
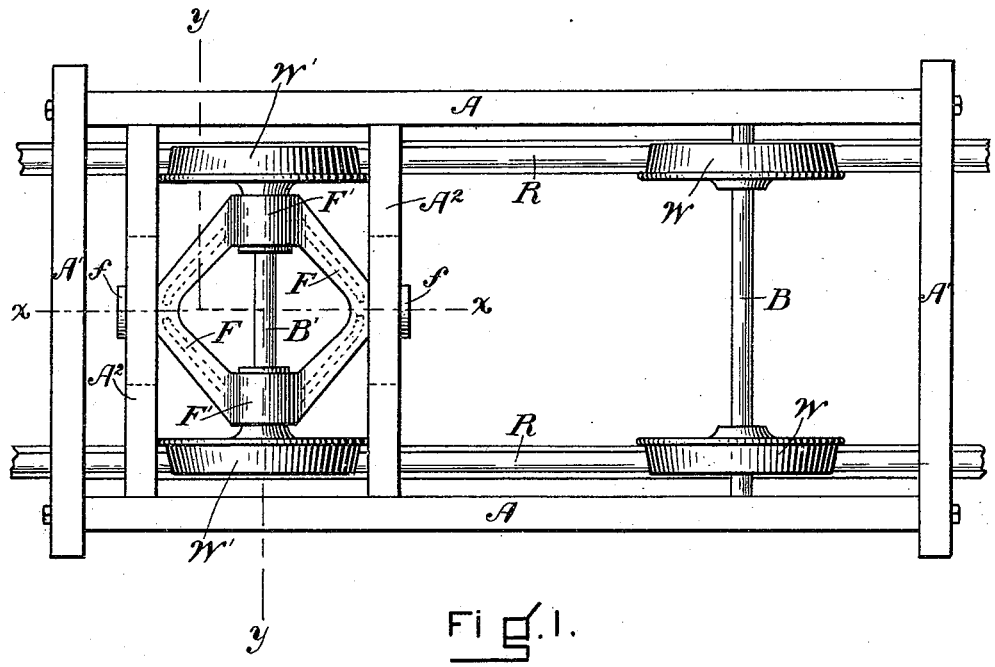
Figure 2:
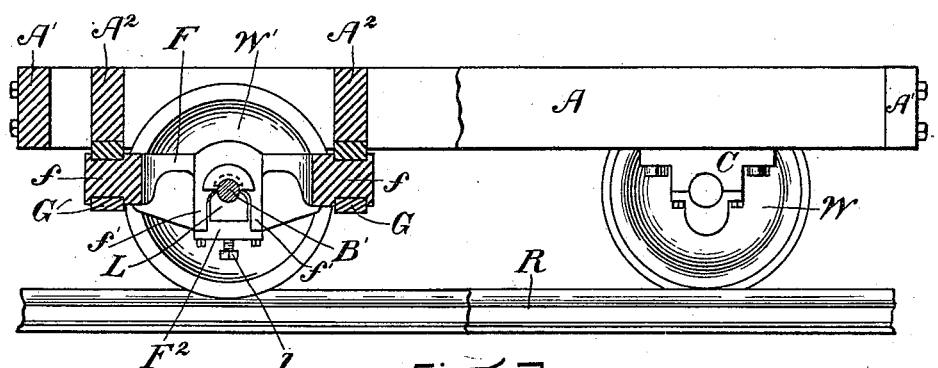
Figure 3:
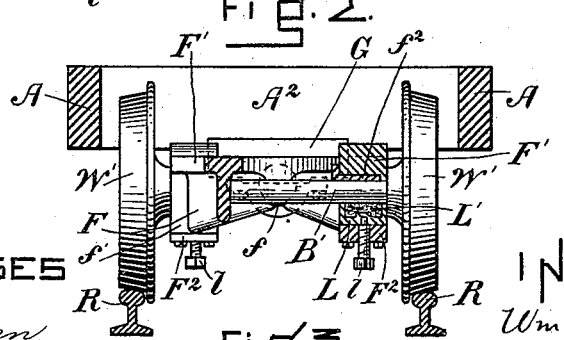

Referring to the accompanying drawings, Figure 1 shows in plan view the frame of a platform-car fitted with my device. Fig. 2 is a side elevation, partly in section, in the plane of $x\ x$, Fig. 1. Fig. 3 is a transverse sectional view in the plane of $y\ y$, Fig. 1.

A A are the side beams, and A' A' the end beams, of the frame of a four-wheeled platform-car.

One axle B of the car has its bearings in any form of journal-boxes, secured to the car-frame in any desired manner. I preferably employ simple pedestal-boxes C, bolted to the under side of the beams A outside the wheels W, using no springs.

The bearing-boxes F' for the other axle B' are at the outer ends of an open rigid frame F, the boxes being preferably integral with said frame. As shown in the drawings, the bearing-boxes F' are inside the wheels W'. The frame F is provided with journals $f$ in line with each other at right angles to the line of the bearing-boxes F' and to the axle B'. These journals are contained in boxes secured to the car-frame in a line passing lengthwise of the car centrally. As shown in the drawings, $A^2\ A^2$ are beams passing transversely between the side beams A A in proper position to have secured to the under sides thereof bearing-boxes G G for the journals $f$.

I preferably make the boxes at either end of the frame F in the shape best shown in Fig. 2, the said boxes being somewhat in the shape of an inverted letter U, of which $f'$ are the two divisions.

In order to prevent the two divisions $f'$ from being strained together by the weight of the car and load I provide the bar $F^2$ at the bottom, bolted to each division $f'$ and so shaped as to complete, as it were, a truss at each bearing-box F', thus preventing the straining together of the divisions $f'$ and greatly strengthening the box.

$f^2$ is the babbitt on the inside of each box F', against which the axle B' directly bears. The axle B' is lubricated in its bearings by means of a cup L, which rests directly on the bottom bar $F^2$ of each box F'. The cup L is open at the top to contain the axle and is held in place by means of a bolt $l$, passing up from beneath through the bottom bar $F^2$ into a recess in the bottom of said cup. The cups L contain waste L', saturated with oil to engage with the axle. By unscrewing the bolt $l$ out of engagement with the recess in the bottom of the cup L the said cup may be moved out from under the axle when desired.

It will be observed from this construction that the axle B' has a free pivotal or rocking motion about the journals $f\,f$ with the result that whatever the irregularity up and down of the rails R with reference to each other all four wheels will be in contact with the rails at all times, providing, of course, that the requisite distance between the rails is at all times kept.

I do not limit myself to the application of this device to cars alone, as it is equally applicable to various forms of vehicles.

I claim—

1. A connection between car frame and axle, consisting of a frame provided with axle bearing-boxes at the outer ends thereof and having journals in a line at right angles to the central axis of said bearing-boxes, said journals engaging with suitable bearings on said car-frame, substantially as and for the purposes described.

2. A car-frame rigidly supported at one end on wheels and having near the other end bearings G G, secured to said car-frame in a line passing lengthwise of the car, in combination with a frame F, having journals engaging with said bearings and provided with axle bearing-boxes in a line at right angles to the line of said journals, and a wheel-supported axle engaging with said bearing-boxes, substantially as and for the purposes described.

3. A connection between car frame and axle, consisting of a frame F, provided with inverted-U-shaped axle bearing-boxes F' at the outer ends thereof and having journals $f$ in a line at right angles to the central axis of said bearing-boxes, said journals engaging with suitable bearings on said car-frame, in combination with strengthening-bars F², bolted to the divisions $f'$ of the bearing-boxes, substantially as and for the purposes described.

In witness whereof I have hereunto set my hand.

WILLIAM G. MILLER.

Witnesses:
   ALBERT E. LEACH,
   E. H. GILMAN.